(12) United States Patent
Flemming et al.

(10) Patent No.: US 7,318,140 B2
(45) Date of Patent: Jan. 8, 2008

(54) METHOD AND APPARATUS FOR DYNAMIC HOSTING PARTITION PAGE ASSIGNMENT

(75) Inventors: Diane Garza Flemming, Pflugerville, TX (US); Octavian Florin Herescu, Austin, TX (US); Agustin Mena, III, Austin, TX (US); Dirk Michel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 10/865,702

(22) Filed: Jun. 10, 2004

(65) Prior Publication Data

US 2005/0278488 A1 Dec. 15, 2005

(51) Int. Cl.
*G06F 12/00* (2006.01)

(52) U.S. Cl. .................. 711/173; 711/165; 711/147; 711/154; 712/1

(58) Field of Classification Search ............... 711/173, 711/165, 147, 154; 712/1
See application file for complete search history.

(56) References Cited

U.S. PATENT DOCUMENTS

2003/0115439 A1* 6/2003 Mahalingam et al. .......... 712/1

* cited by examiner

*Primary Examiner*—Kimberly McLean-Mayo
(74) *Attorney, Agent, or Firm*—Duke W. Yee; Diana R. Gerhardt; Wayne P. Bailey

(57) ABSTRACT

A method, apparatus, and computer instructions for transferring data. The data in a first partition is received within a memory region assigned to the first partition in the logical partitioned data processing system to form received data. The memory region is assigned to a second partition, in response to a determination that the received data is for the second partition. The second partition may then access the data in the memory region.

22 Claims, 7 Drawing Sheets

100 DATA PROCESSING SYSTEM

METHOD AND APPARATUS FOR DYNAMIC HOSTING PARTITION PAGE ASSIGNMENT

BACKGROUND OF THE INVENTION

1. Technical Field

The present invention relates generally to an improved data processing system and in particular to an improved method and apparatus for transferring data. Still more particularly, the present invention relates to an improved method, apparatus, and computer instructions for transferring data from one partition to another partition in a logically partitioned data processing system.

2. Description of Related Art

Increasingly large symmetric multi-processor data processing systems, such as IBM eServer P690, available from International Business Machines Corporation, DHP9000 Superdome Enterprise Server, available from Hewlett-Packard Company, and the Sunfire 15K server, available from Sun Microsystems, Inc. are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocatable resources include one or more architecturally distinct processors with their interrupt management area, regions of system memory, and input/output (I/O) adapter bus slots. The partition's resources are represented by the platform's firmware to the operating system image.

Each distinct operation system or image of an operating system running within a platform is protected from each other such that software errors on one logical partition cannot affect the correct operations of any of the other partitions. This protection is provided by allocating a disjointed set of platform resources to be directly managed by each operating system image and by providing mechanisms for insuring that the various images cannot control any resources that have not been allocated to that image. Furthermore, software errors in the control of an operating system's allocated resources are prevented from affecting the resources of any other image.

Thus, each image of the operating system or each different operating system directly controls a distinct set of allocatable resources within the platform. With respect to hardware resources in a logical partitioned data processing system, these resources are disjointly shared among various partitions. These resources may include, for example, input/output (I/O) adapters, memory DIMMs, non-volatile random access memory (NVRAM), and hard disk drives. Each partition within an LPAR data processing system may be booted and shut down over and over without having to power-cycle the entire data processing system.

In logical partitioned environments, one partition typically hosts input/output (I/O) requests, such as those received from a network adapter associated with this partition. The data is copied from the pinned memory region for the network adapter to a local memory region for the partition hosting the I/O requests. This partition is typically referred to as the hosting partition. If the data has been requested by another partition other than the hosting partition, the data is copied from the local memory region for the hosting partition to the local memory region for the requesting partition.

This currently used system for transferring data requires an additional data copy operation when compared to non-partitioned systems. In a non-partitioned system, the data is copied from the memory region for the adapter to the main memory where the data is available for use by an application for processing. In contrast, in a logical partitioned data processing system, a further copy operation is required to move the data from the memory region associated with the hosting partition to the memory region for the partition requesting the data.

This additional operation requires additional processor resources and time. As a result, performance degradation may result when a large number of data requests occur. Therefore, it would be advantageous to have an improved method, apparatus, and computer instructions for providing a requesting partition access to data in a logical partitioned data processing system.

SUMMARY OF THE INVENTION

The present invention provides a method, apparatus, and computer instructions for transferring data. The data in a first partition is received within a memory region assigned to the first partition in the logical partitioned data processing system to form received data. The memory region is assigned to a second partition, in response to a determination that the received data is for the second partition. The second partition may then access the data in the memory region.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
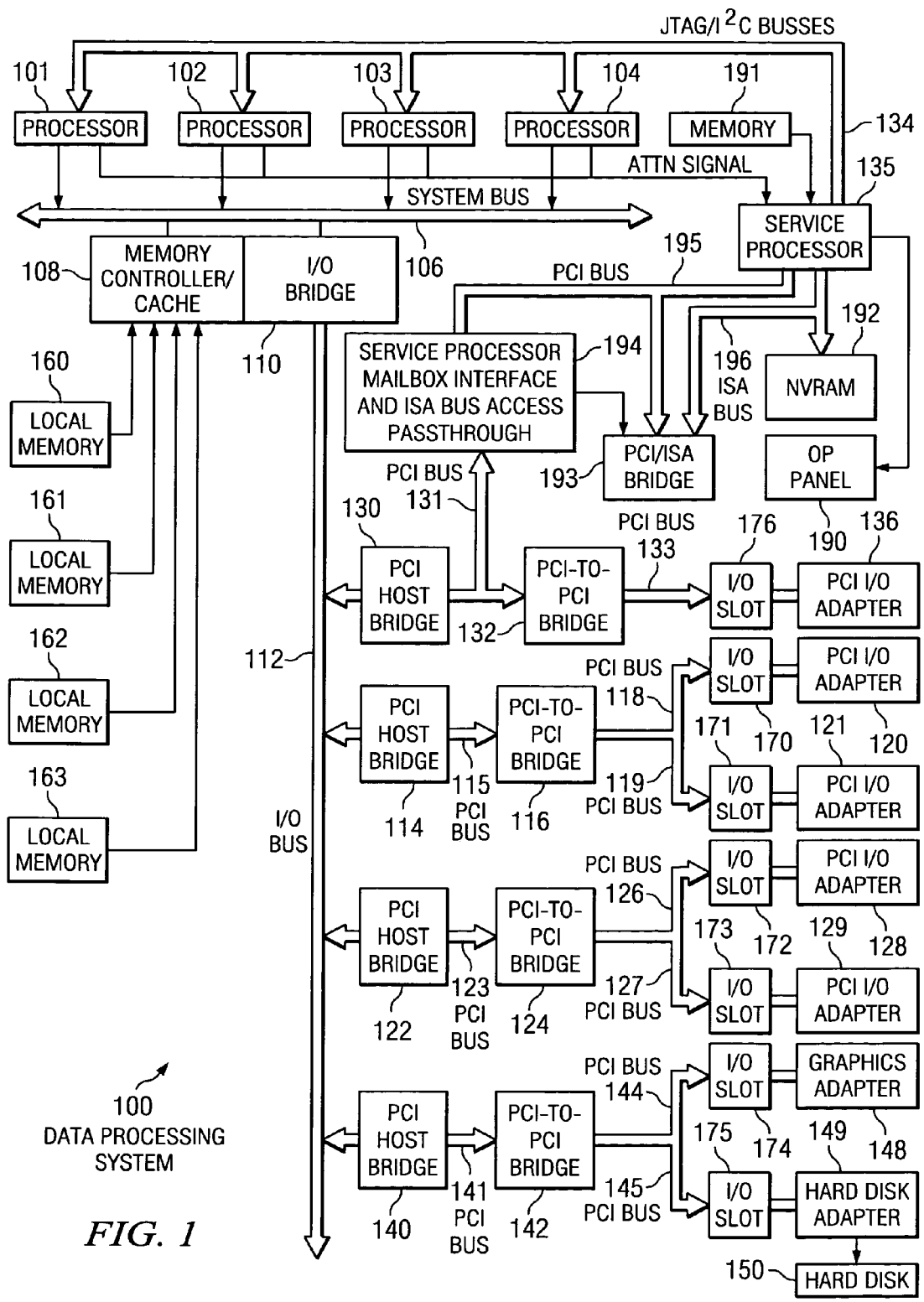
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to Load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
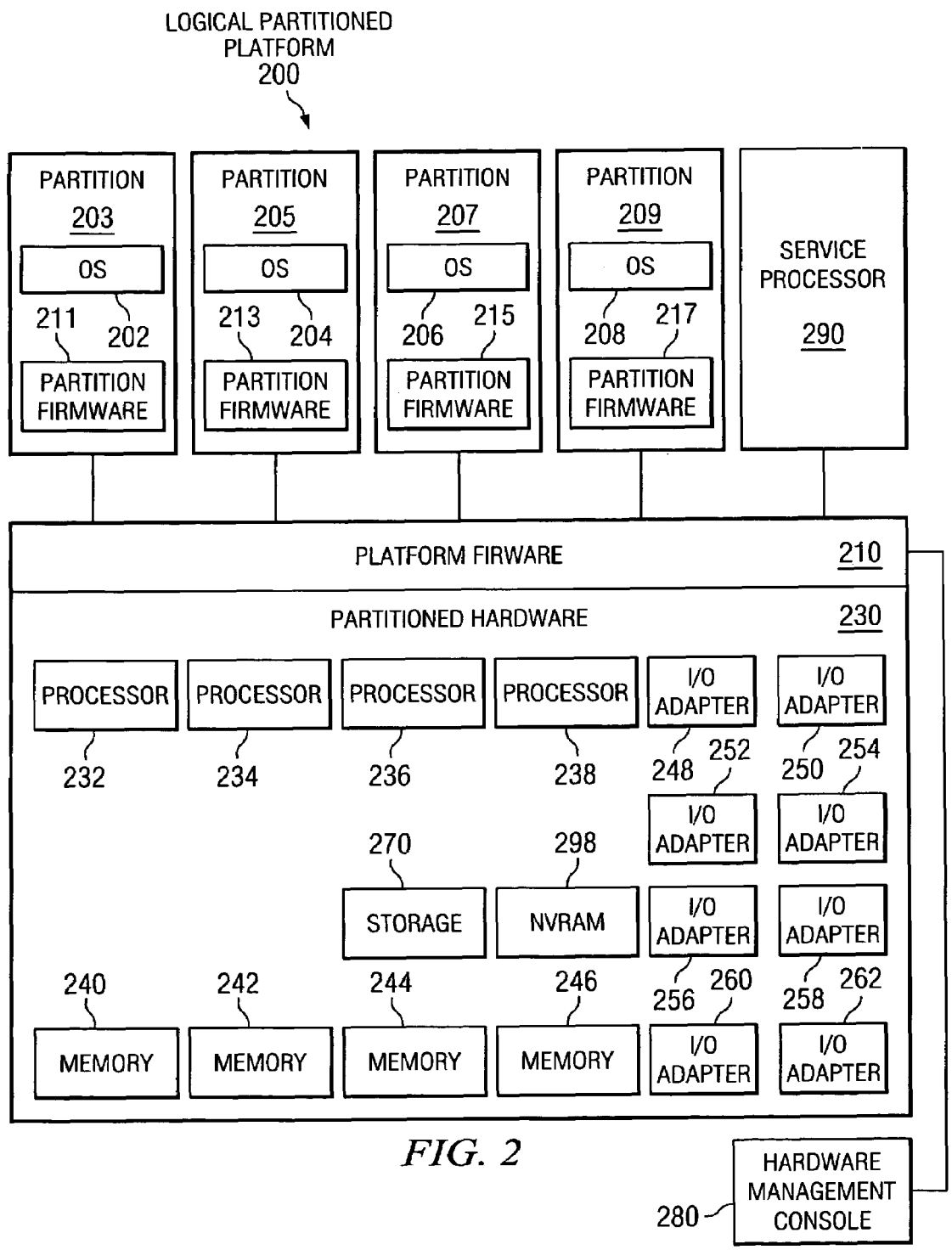
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The present invention provides an improved method, apparatus, and computer instructions for transferring data from one partition to another partition in a logical partitioned data processing system. When data that is destined for another partition arrives at a hosting partition, the hosting partition avoids the copying step or operation that is currently used in which data is copied from the local memory region from the hosting partition to the memory region for the requesting partition. The avoidance of this additional copying step is accomplished by reassigning the memory region for the host partition to the partition for which the data is destined.

Figure 3:
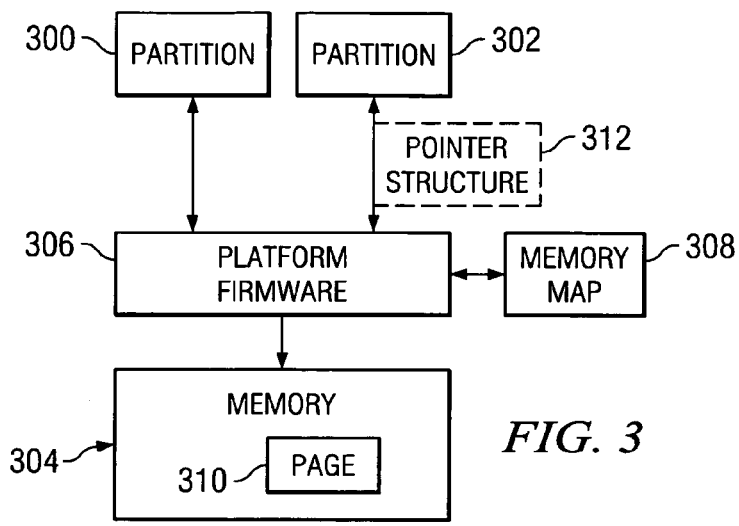
FIG. 3 is a diagram illustrating components used in passing data from one partition to another partition in accordance with a preferred embodiment of the present invention.

Turning next to FIG. 3, a diagram illustrating components used in passing data from one partition to another partition is depicted in accordance with a preferred embodiment of the present invention. In this illustrative example, partition 300 is a hosting partition, which receives data in an I/O operation. This data may be received, for example, through a network adapter assigned to partition 300. Partition 302 is a requesting partition that needs the data received by partition 300.

In these illustrative examples, memory 304 contains memory regions that may be assigned to partition 300 and partition 302. Access to data in memory 304 is handled through platform firmware 306. The assignment of memory regions within memory 304 to the different regions may be tracked through memory map 308.

Page 310 is a memory region in memory 304 containing data received by partition 300. Page 310 is assigned to partition 300 and cannot be accessed by partition 302. Partition 302 needs access to the data in page 310. Normally without the mechanism of the present invention, the data in this page is copied to a memory region that is assigned to partition 302. This copying step is avoided using the mechanism of the present invention.

Instead of copying the data in page 310 to another memory region, this memory region is reassigned to partition 302. In these examples, the memory region being reassigned, such as page 310 is reassigned in page-sized increments in the illustrative examples. Of course other sizes may be used depending on the particular implementation.

Once page 310 in the hosting partition is populated with the requested data. The memory region, page 310, is then assigned to the requesting partition, partition 302, through a call to platform firmware 306 and then the pointer structure 312 is passed along to the requesting partition, partition 302.

This firmware may be, for example, a hypervisor, which is available from International Business Machines Corporation.

Pointer structure 312 in the illustrative examples contains the address of the memory region and the length, of the memory region in pages. In this illustrative example, pointer structure 312 contains an address for page 310 with a length of one to indicate a single page. After the application in the requesting partition has processed the data in page 310, partition 302 releases the memory region containing page 310, through another firmware call to platform firmware 306. This second call results in page 310 being reassigned back to the hosting partition, partition 300. This mechanism avoids copying data by passing a pointer. The firmware request for dynamic page reassignment is not charged to the requesting partition because the activity occurs "under the covers".

Because the memory regions being reassigned are from the hosting partition, this mechanism of the present invention does not interfere with the requesting partition's affinity domain. In other words, the affinity domain of the local requesting partition is preserved by not reassigning pages from its local memory region. Only pages from the hosting partitions are eligible for reassignment in these illustrative examples.

Figure 4A:
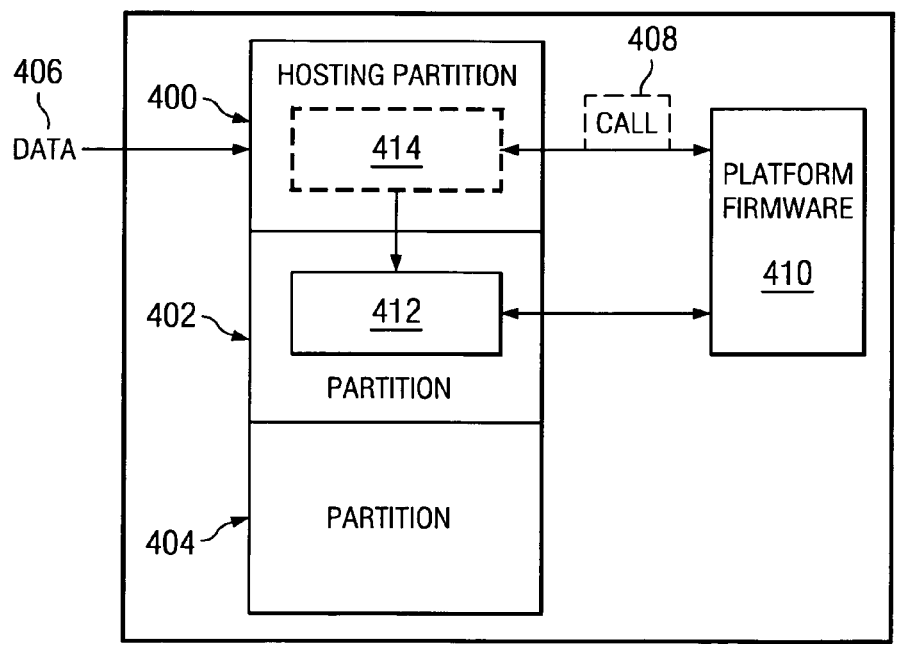
FIGS. 4A-4B are diagrams illustrating reassignment of pages from one partition to another partition in accordance with a preferred embodiment of the present invention.
Figure 4B:
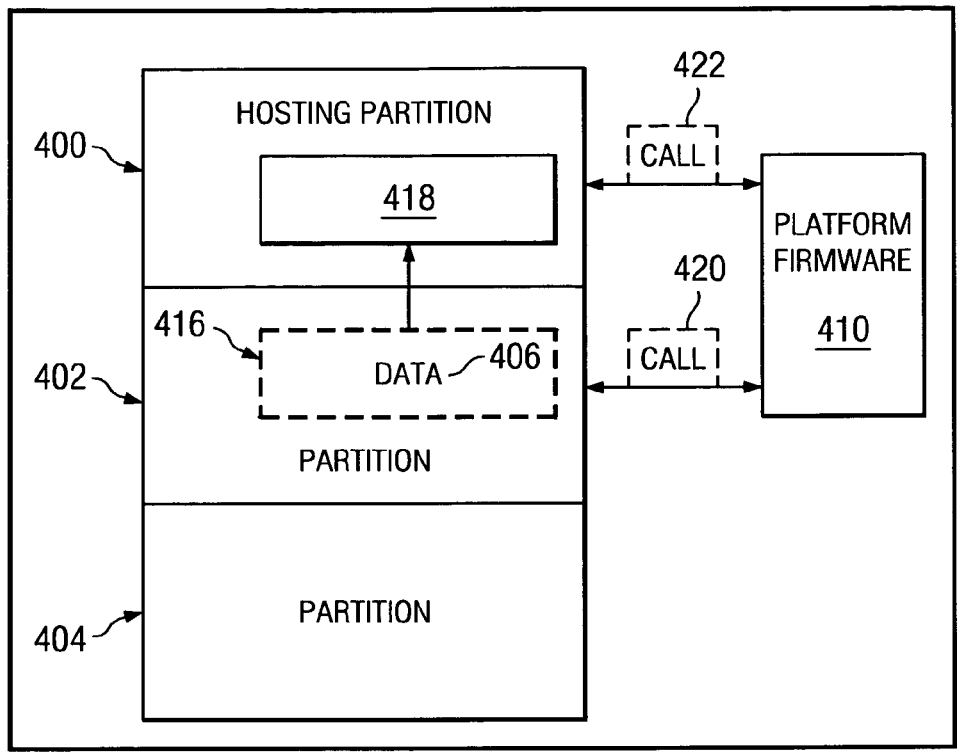

With reference next to FIGS. 4A-4B diagrams illustrating reassignment of pages from one partition to another partition are depicted in accordance with a preferred embodiment of the present invention. In FIG. 4A, hosting partition 400, partition 402, and partition 404 are present in a logical partitioned data processing system. Data 406 is placed into a memory region within hosting partition 400. Data 406 is destined for or has been requested by partition 402. This reassignment is made through call 408 from hosting partition 400 to platform firmware 410. Rectangle 412 indicates that partition 402 is assigned the memory region. Dashed rectangle 414 in hosting partition 400 indicates that the memory region has been reassigned from hosting partition 400 to hosting partition 402.

In FIG. 4B, when data 406 has been processed, the memory region is restored or reassigned back to hosting partition 400 from partition 402. When data 406 is no longer needed, call 420 is made to platform firmware 410 to release the memory region. At this point, call 422 is made to reassign the memory region back to hosting partition 400. Dashed rectangle 416 in partition 402 and rectangle 418 in hosting partition 400 indicates that the memory region has been reassigned from partition 402 to hosting partition 400.

Although the memory region is shown in different partitions, the memory region actually does not move or change addressing. The illustration of the memory region using dashed rectangles and rectangles is for the purpose of illustrating ownership or assignment of the memory region to a particular region.

Figure 5A:
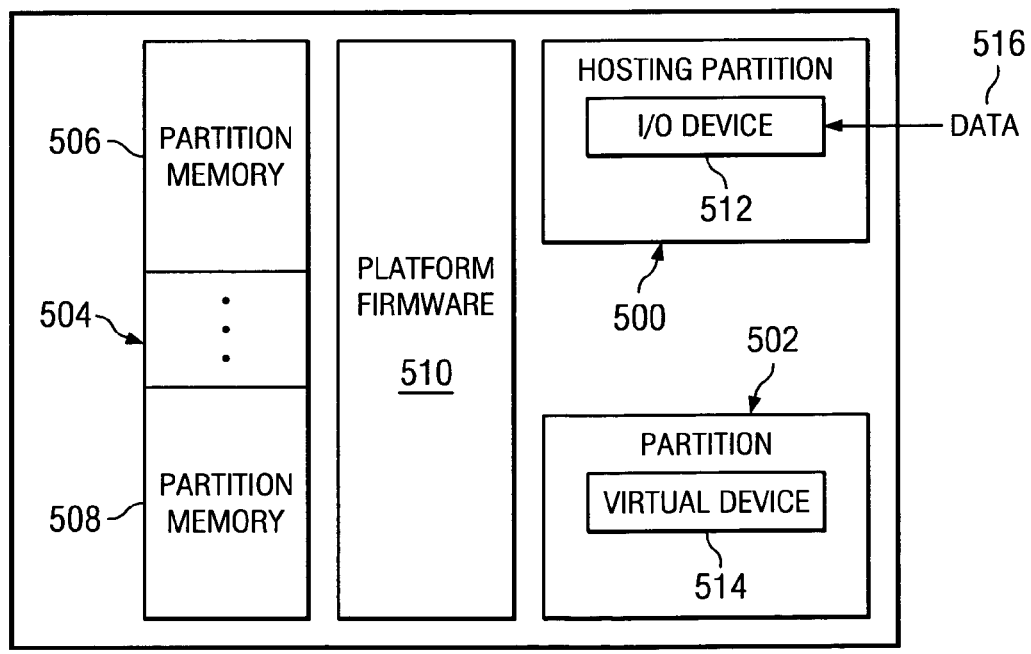
FIGS. 5A-5E are diagrams illustrating dynamic page assignments in accordance with a preferred embodiment of the present invention.

Turning next to FIGS. 5A-5E, diagrams illustrating dynamic page assignments are depicted in accordance with a preferred embodiment of the present invention. In FIG. 5A, hosting partition 500 and partition 502 are shown. Additionally, memory 504 is present in which memory 504 includes partition memory 506 and partition memory 508. Partition memory 506 is a section of memory assigned to hosting partition 500 in these examples. Partition memory 508 is a section of memory assigned to partition 502. Assignment and access to memory 504 by hosting partition 500 and partition 502 now is facilitated through platform firmware 510.

Hosting partition 500 is assigned I/O device 512. This I/O device may be, for example, a physical network adapter. Partition 502 is assigned virtual device 514, which may be, for example, a virtual network adapter. In this example, data 516 is received through I/O device 512. This data is destined for partition 502. Partition 502 cannot directly receive the data in this example because this partition does not have a physical I/O device.

Figure 5B:
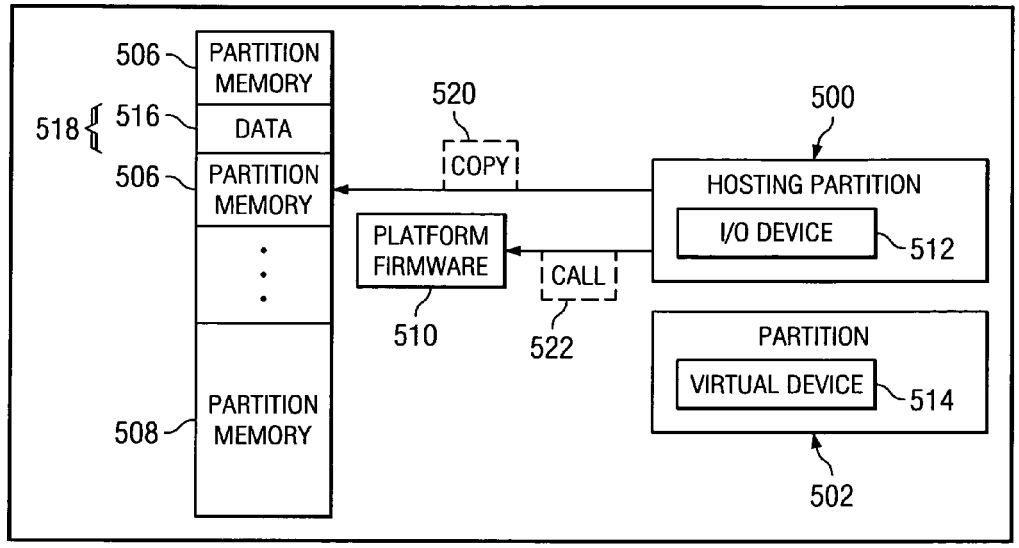

Data 516 is received in a memory associated or assigned to memory I/O device 512. In FIG. 5B, data 516 is copied into memory region 518 through copy operation 520 initiated by hosting partition 500. This copy operation is facilitated through a call to platform firmware 510. In these examples, memory region 518 has a size or length of one or more pages. Additionally, platform firmware 510 is informed that data 516 is destined for partition 502 through call 522.

Figure 5C:
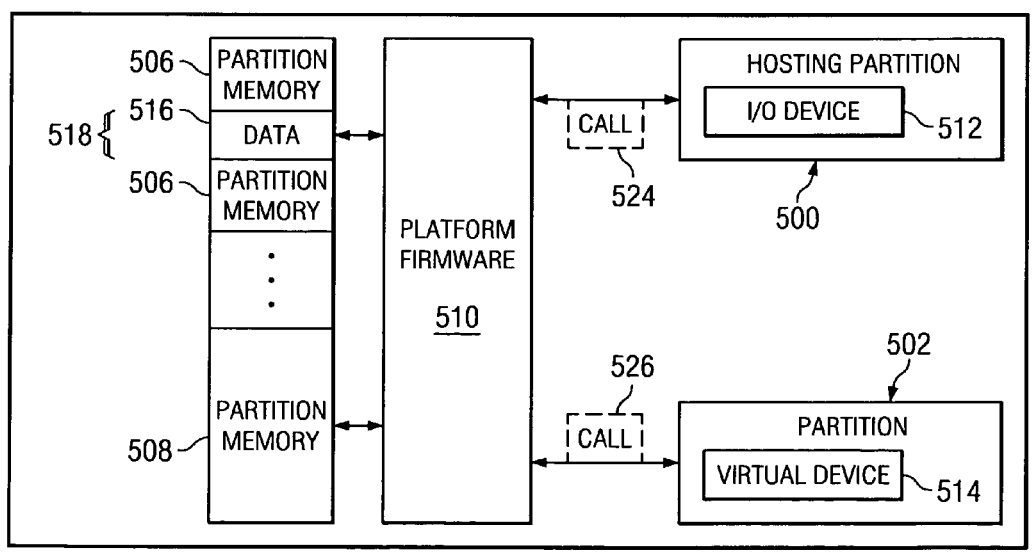
Figure 5D:
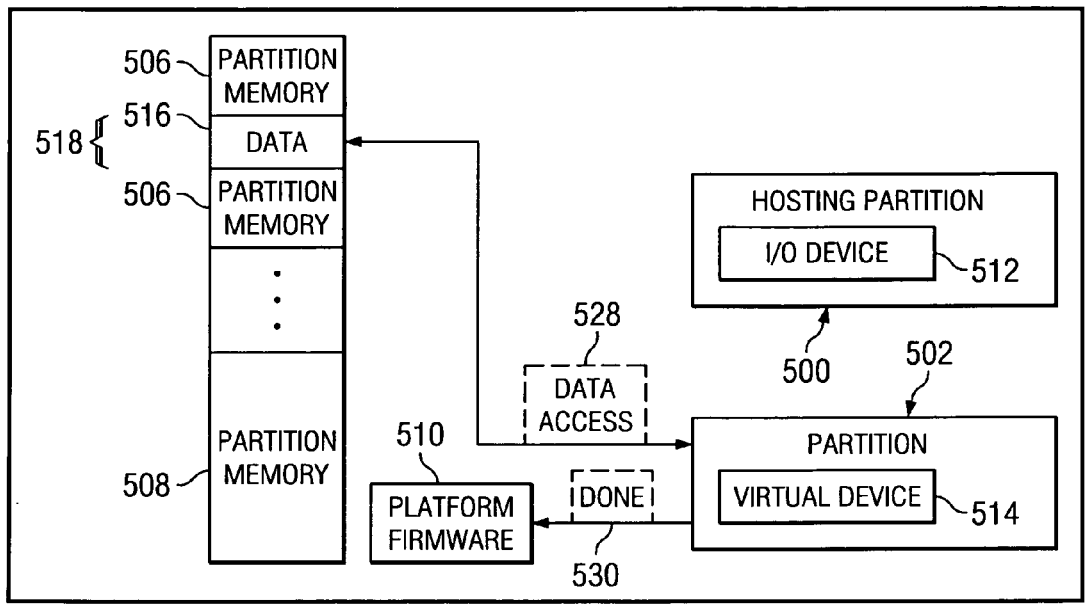

Turning next to FIG. 5C, reassignment of memory region 518 occurs through call 524, which is made by platform firmware 510 to hosting partition 500. Call 524 causes hosting partition 500 to remove any of the pages in memory region 518 from the addressable space of hosting partition 500. Next, call 526 is made by platform firmware 510 to add the pages in memory region 518 to the addressable space for partition 502. The operating system in the partition deals with virtual addresses, while the partition firmware handles physical addresses in accessing addressable space in the memory. At this point memory region 518 has been reassigned from hosting partition 500 to partition 502.

Figure 5E:
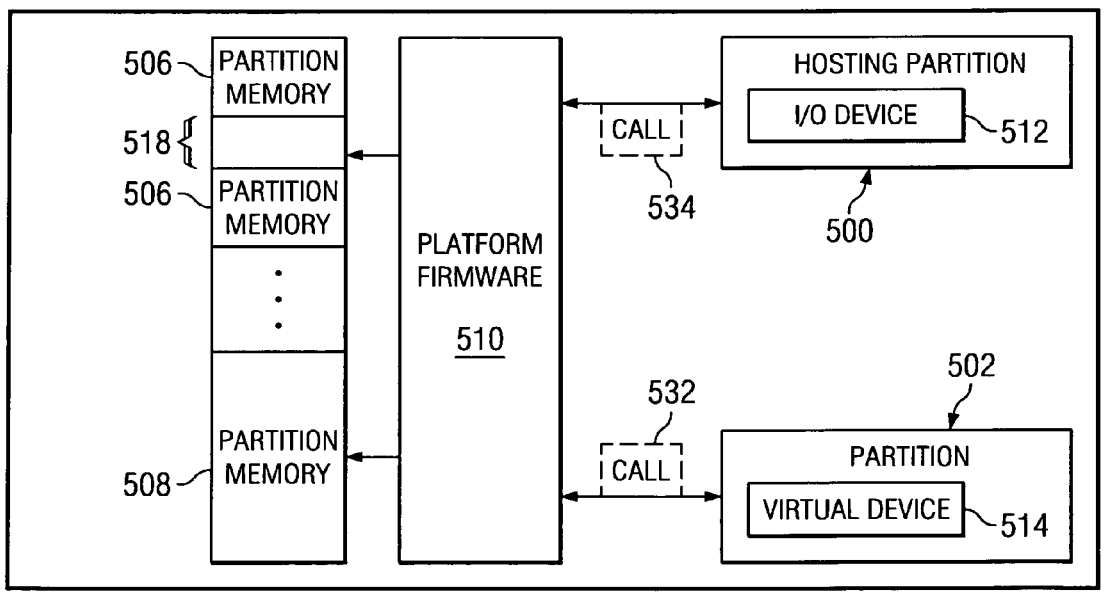

With the reassignment of memory region 518, partition 502 may perform data access 528 to access data 516 in memory region 518 as shown in FIG. 5C. When hosting partition 500 has completed using data 516, "done" call 530 is sent by partition 502 to platform firmware 510 in FIG. 5D. This call is used to release memory region 518. In FIG. 5E platform firmware 510 issues call 532 to partition 502 to remove the page or pages in memory region 518 from the addressable space for partition 502. Call 534 is then issued to hosting partition 500 to add memory region 518 to this partition's addressable space. This call reassigns memory region 518 back to hosting partition 500.

In this manner, no copying of data is needed to transfer data from one partition to another partition. Instead, the memory region containing the data is reassigned to the appropriate partition.

Figure 6:
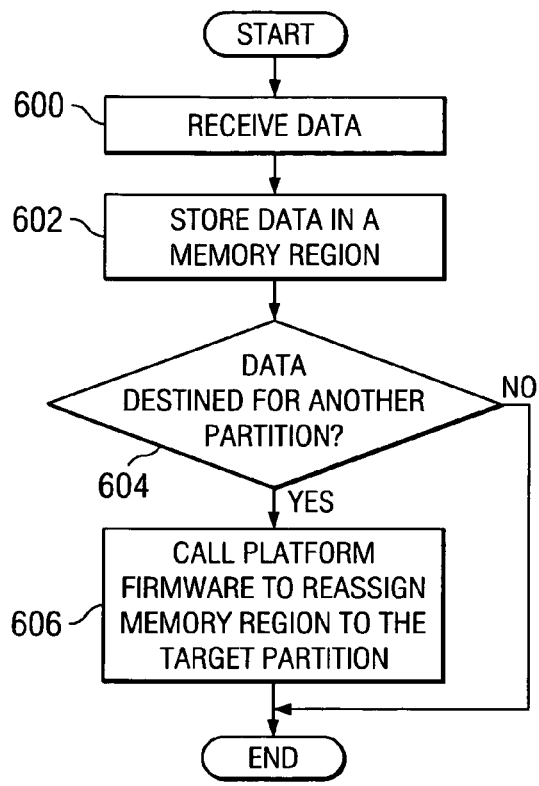
FIG. 6 is a flowchart of a process for transferring data from one partition to another partition in accordance with a preferred embodiment of the present invention.

With reference now to FIG. 6, a flowchart of a process for transferring data from one partition to another partition is depicted in accordance with a preferred embodiment of the present invention. The process illustrated in FIG. 6 may be implemented in a partition, such as hosting partition 500 in FIG. 5.

The process begins by receiving data (step 600). This data is received as part of an I/O operation. The data may be received at an I/O device assigned or allocated to the partition. This I/O device may be, for example, a network adapter. Next, data is stored in a memory region (step 602). Step 602 involves transferring or copying the data from the memory of an I/O device into the memory region assigned to the partition receiving the I/O device.

Then, a determination is made as to whether the data is destined for another partition (step 604). If the data is destined for another partition, then platform firmware is called to reassign the memory region to the target partition (step 606) with the process terminating thereafter. In response to this call, the platform firmware will make calls to the partition receiving the data and to the partition that is to use the data to change the addressable space in a manner to reassign the memory region containing the data to the partition that is to use the data in these illustrative examples. Referring back to step 604, if data is not destined for another partition, then the process terminates.

Figure 7:
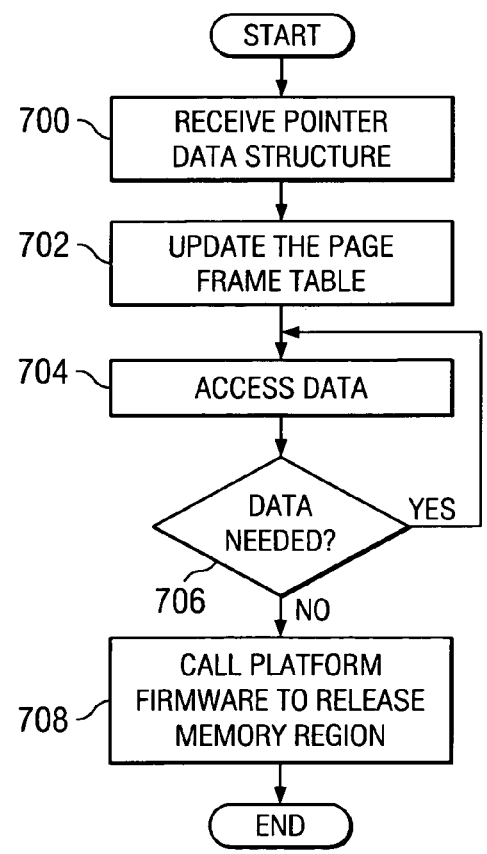
FIG. 7 is a flowchart of a process for obtaining access to data in accordance with a preferred embodiment of the present invention.

With reference now to FIG. 7, a flowchart of a process for obtaining access to data by the partition requesting data (hosted) is depicted in accordance with a preferred embodiment of the present invention. The process illustrated in FIG. 7 may be implemented in a partition, such as partition 502 in FIG. 5.

The process begins by receiving a pointer data structure (step 700). In these examples, receiving the pointer data structure results in adding pages to the addressable space, which changes the page frame table on a temporary basis. The page frame table is updated with the addressable space pointed to by the pointer data structure (step 702). Next, data is accessed (step 704). Then, a determination is made as to whether data is still needed by the partition (step 706). An application in the partition may still require access to the data for processing. In this case, the data is still needed. If the processing of the data has completed, then the data is no longer needed in these illustrative examples.

If the data is not needed, then platform firmware is called to release the memory region (step 708) with the process terminating thereafter. This call is made to the platform firmware in these examples. Referring back to step 706, if the data is needed then the process returns to step 704 as described above.

Thus, the present invention provides an improved method, apparatus, and computer instructions for transferring data from one partition to another partition. A copying step is eliminated by reassigning a memory region allocated from one partition to another partition. This reallocation allows the second partition to access the data.

Reducing the number of data copies results in a reduction of the load on the virtual memory manager. This easing of the load on the virtual memory manager is important to all partitions running on the system because the partitions do not need to wait as long for their own I/O requests to be processed. Additionally, this feature reduces overall response time for a single I/O request. Reducing the response time also is important from the application perspective. Applications with tight response time requirements are better served by a mechanism such as that of the present invention, which reduces the number of operations needed to access data.

Although the description of the illustrative embodiments are directed towards the behavior of a traditional logical partitioned data processing system environment, the mechanism of the present invention also may be used in a shared resource partitioning environment.

Shared processor LPAR is a main-frame inspired technology that may be implemented in pseries LPAR machines available from International Business Machines Corporation. The shared processor concept allows logical partitions to use fractions or portions of one or more physical processors.

The firmware manages the partitions by dispatching and time-slicing them on the physical processors as required. In this environment, multiple shared processor LPAR partitions share the same physical processors.

The shared processor LPAR support is not only the ability for finer grained partitioning, but more efficient use of physical resources. While shared processor LPAR refers, specifically, to the sharing of physical processors between multiple partitions, the introduction of "virtualization" of resources inspires another set of shared resource partitioning. In this case, a single physical I/O device, such as a network adapter, or a storage device, can be shared among multiple partitions through the creation of a virtualized hosting partition.

Both the shared processor LPAR and the virtualized hosting partition environments fall under the category of shared resource partitioning. The method, apparatus, and computer instructions of the present invention may be applied to these types and other types of logical partitioned data processing system environments.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a logical partitioned data processing system for transferring data, the method comprising:
   receiving the data in a first partition within a memory region assigned to the first partition in the logical partitioned data processing system to form received data;
   responsive to a determination that the received data is for a second partition, assigning the memory region to the second partition, wherein the second partition may access the data in the memory region; and sending a pointer structure to the second partition after assigning the memory region to the second partition, wherein the pointer structure includes an address of the memory region, and wherein the pointer structure further includes a length of the memory region.

2. The method of claim 1, wherein the first partition is a host partition.

3. The method of claim 1, wherein the memory region is a page.

4. The method of claim 1, wherein the assigning step includes:
making a call to platform firmware to assign the memory region to the second partition, wherein the logical partitioned data processing system comprises a plurality of hardware devices and wherein the platform firmware is partition management firmware that is usable to manage the plurality of hardware devices in providing simultaneous execution of a plurality of independent operating system images by virtualizing the plurality of hardware devices of the logical partitioned data processing system.

5. The method of claim 1, wherein the receiving step and the assigning step are performed by the first partition.

6. The method of claim 1 further comprising:
releasing the memory region from use by the second partition when access to the data is unnecessary.

7. A method in a logical partitioned data processing system for transferring data, the method comprising:
receiving the data in a first partition within a memory region assigned to the first partition in the logical partitioned data processing system to form received data;
responsive to a determination that the received data is for a second partition, assigning the memory region to the second partition, wherein the second partition may access the data in the memory region;
releasing the memory region from use by the second partition when access to the data is unnecessary; and
reassigning the memory region to the first partition in response to the memory region being released by the second partition.

8. The method of claim 1, wherein the data in the memory region is received through an adapter assigned to the first partition.

9. A logical partitioned data processing system for transferring data, the data processing system comprising:
receiving means for receiving the data in a first partition within a memory region assigned to the first partition in the logical partitioned data processing system to form received data;
assigning means, responsive to a determination that the received data is for a second partition, for assigning the memory region to the second partition, wherein the second partition may access the data in the memory region; and
sending means for sending a pointer structure to the second partition after assigning the memory region to the second partition, wherein the pointer structure includes an address of the memory region, and wherein the pointer structure further includes a length of the memory region.

10. The data processing system of claim 9, wherein the first partition is a host partition.

11. The data processing system of claim 9, wherein the memory region is a page.

12. The data processing system of claim 9, wherein the assigning means includes:
making means for making a call to platform firmware to assign the memory region to the second partition, wherein the logical partitioned data processing system comprises a plurality of hardware devices and wherein the platform firmware is partition management firmware that is usable to manage the plurality of hardware devices in providing simultaneous execution of a plurality of independent operating system images by virtualizing the plurality of hardware devices of the logical partitioned data processing system.

13. The data processing system of claim 9, wherein the receiving means and the assigning means are located in the first partition.

14. The data processing system of claim 9 further comprising:
releasing means for releasing the memory region from use by the second partition when access to the data is unnecessary.

15. A logical partitioned data processing system for transferring data, the data processing system comprising:
receiving means for receiving the data in a first partition within a memory region assigned to the first partition in the logical partitioned data processing system to form received data;
assigning means, responsive to a determination that the received data is for a second partition, for assigning the memory region to the second partition, wherein the second partition may access the data in the memory region;
releasing means for releasing the memory region from use by the second partition when access to the data is unnecessary; and
reassigning means for reassigning the memory region to the first partition in response to the memory region being released by the second partition.

16. The data processing system of claim 9, wherein the data in the memory region is received through an adapter assigned to the first partition.

17. A computer program product in a computer readable medium for transferring data, the computer program product comprising:
first instructions for receiving the data in a first partition within a memory region assigned to the first partition in the logical partitioned data processing system to form received data;
second instructions, responsive to a determination that the received data is for a second partition, for assigning the memory region to the second partition, wherein the second partition may access the data in the memory region;
third instructions for releasing the memory region from use by the second partition when access to the data is unnecessary; and
fourth instructions for reassigning the memory region to the first partition in response to the memory region being released by the second partition.

18. The computer program product of claim 17 further comprising:
third instructions for sending a pointer structure to the second partition after assigning the memory region to the second partition.

19. The computer program product of claim 17, wherein the pointer structure includes an address of the memory region.

20. The computer program product of claim 17, wherein the memory region is a page.

21. The computer program product of claim 17, wherein the second instructions includes:
 sub-instructions for making a call to platform firmware to assign the memory region to the second partition, wherein the logical partitioned data processing system comprises a plurality of hardware devices and wherein the platform firmware is partition management firmware that is usable to manage the plurality of hardware devices in providing simultaneous execution of a plurality of independent operating system images by virtualizing the plurality of hardware devices of the logical partitioned data processing system.

22. A logical partitioned data processing system comprising:
 a bus system;
 a memory connected to the bus system, wherein the memory includes a set of instructions; and
 a processing unit connected to the bus system, wherein the processing unit executes the set of instructions to receive data in a first partition within a memory region assigned to the first partition in the logical partitioned data processing system to form received data and assign the memory region to a second partition, wherein the second partition may access the data in the memory region, in response to a determination that the received data is for the second partition, wherein the set of instructions are contained in platform firmware that is executed to assign the memory region to the second partition, and wherein the logical partitioned data processing system comprises a plurality of hardware devices and wherein the platform firmware is partition management firmware that is usable to manage the plurality of hardware devices in providing simultaneous execution of a plurality of independent operating system images by virtualizing the plurality of hardware devices of the logical partitioned data processing system.

\* \* \* \* \*